US009371175B2

(12) United States Patent
Dogan et al.

(10) Patent No.: US 9,371,175 B2
(45) Date of Patent: Jun. 21, 2016

(54) CAPSULE FOR USE IN A BEVERAGE PREPARATION MACHINE

(75) Inventors: Nihan Dogan, La Croix-sur-Lutry (CH); Frederic Doleac, Vaux et Chantegrue (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/240,136

(22) PCT Filed: Jul. 27, 2012

(86) PCT No.: PCT/EP2012/064752
§ 371 (c)(1),
(2), (4) Date: Feb. 21, 2014

(87) PCT Pub. No.: WO2013/026650
PCT Pub. Date: Feb. 28, 2013

(65) Prior Publication Data
US 2014/0186498 A1    Jul. 3, 2014

(30) Foreign Application Priority Data

Aug. 22, 2011   (EP) .................................... 11178246

(51) Int. Cl.
*B65D 85/804* (2006.01)
*A47J 31/00* (2006.01)
*A47J 31/40* (2006.01)

(52) U.S. Cl.
CPC .......... *B65D 85/8043* (2013.01); *B65D 85/804* (2013.01); *A47J 31/00* (2013.01); *A47J 31/40* (2013.01); *A47J 31/407* (2013.01)

(58) Field of Classification Search
CPC ............. B65D 85/8043; B65D 85/804; B65D 51/002; B65D 51/005; B65D 53/06
USPC ........................... 426/78, 79, 84, 115; 99/295
See application file for complete search history.

(56) References Cited

U.S. PATENT DOCUMENTS

| 2005/0051478 A1* | 3/2005 | Karanikos .......... B65D 85/8043 |
| | | 210/469 |
| 2009/0126577 A1* | 5/2009 | Ternite ................ A47J 31/0673 |
| | | 99/295 |

(Continued)

FOREIGN PATENT DOCUMENTS

DE   202006013189   10/2006
EP       1864917     12/2007

(Continued)

OTHER PUBLICATIONS

Aeromarine Products ("Food Grade Silicone Moldmaking Rubber"), Published May 12, 2011, http://web.archive.org/web/20110512171711/http://www.aeromarineproducts.com/food-grade-silicone-rubber.htm.*

(Continued)

*Primary Examiner* — Drew Becker
*Assistant Examiner* — Bryan Kim
(74) *Attorney, Agent, or Firm* — K&L Gates LLP

(57) ABSTRACT

The present invention concerns a capsule (1) defining a closed chamber for enclosing a mass of soluble and/or extractable food material, for use in a beverage preparation machine, comprising: (i) capsule side walls (2), (ii) a top membrane (3) pierceable by injection means (4) of the machine which are adapted to inject an extraction liquid under pressure inside said chamber, and (iii) a bottom wall (5) (iv) means (6, 7) adapted to open said chamber by relative engagement with the bottom wall (5) under the effect of the liquid pressure increase in the chamber during injection of said liquid characterized in that at least the portion of the top membrane surface which is to be pierced by the fluid injection means (4), comprises an elastic material having a tensile strength higher than 1 Mpa, preferably higher than 5 MPa, more preferably higher than 10 MPa and an elongation at break superior to 100%, preferably superior to 500%, such that said top membrane (3) recloses in a leaktight manner, after said fluid injection means (4) have been removed therefrom.

9 Claims, 3 Drawing Sheets

(56) References Cited

U.S. PATENT DOCUMENTS

2010/0078480 A1 * 4/2010 Aker ............... G06K 19/06009
 235/462.08
2010/0288131 A1 * 11/2010 Kilber ............... B65D 85/8043
 99/295

FOREIGN PATENT DOCUMENTS

| EP | 1864917 B1 * | 8/2008 | ........... B65D 85/804 |
| JP | 2010521263 | 6/2010 | |
| JP | 2012510323 | 5/2012 | |
| WO | 2008116818 | 10/2008 | |
| WO | 2010063644 | 6/2010 | |

OTHER PUBLICATIONS

Britannica Online Encyclopedia (tensile strength), Published May 2, 2008, http://web.archive.org/web/20081101150219/http://www.britannica.com/EBchecked/topic/587505/tensile-strength.*

About (Elongation at Break), Published Sep. 20, 2005, http://web.archive.org/web/20050920140238/http://composite.about.com/library/glossary/e/bldef-e1955.htm.*

Japanese Office Action for Patent Application No. P2014-526434 dated Jan. 5, 2016.

* cited by examiner

CAPSULE FOR USE IN A BEVERAGE PREPARATION MACHINE

CROSS REFERENCE TO RELATED APPLICATIONS

The present application is a National Stage of International Application No. PCT/EP 2012/064752, filed on Jul. 27, 2012, which claims priority to European Patent Application No. 11178246.2, filed Aug. 22, 2011, the entire contents of which are being incorporated herein by reference.

FIELD OF THE INVENTION

The present invention concerns a capsule for use in a beverage preparation machine, whose top pierceable membrane is self reclosable.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working with a rigid capsule.

The machine comprises a receptacle for accommodating said capsule and a fluid injection system for injecting a fluid, preferably water, under pressure into said capsule. Water injected under pressure in the capsule, for the preparation of a coffee beverage according to the present invention, is preferably hot, that is to say at a temperature above 70° C. However, in some particular instances, it might also be at ambient temperature. The pressure inside the capsule chamber during extraction and/or dissolution of the capsule contents is typically about 1 to 8 bar for dissolution products, 2 to 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee within a few seconds.

The principle of extracting and/or dissolving the contents of a closed capsule under pressure is known and consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patent no EP 1 472 156 B1, and in EP 1 784 344 B1.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is selected via a selecting valve means, such as for instance a peristaltic valve of the type described in applicant's European patent application EP 2162653 A1.

When the beverage to be prepared is coffee, one interesting way to prepare the said coffee is to provide the consumer with a capsule containing roast and ground coffee powder, which is to be extracted with hot water injected therein.

Capsules have been developed for such an application, which are described and claimed in applicant's European patent EP 1 784 344 B1, or in European patent application EP 2 062 831.

In short, such capsules comprise typically:
- a hollow body and an injection wall which is impermeable to liquids and to air and which is attached to the body and adapted to be punctured by e.g. an injection needle of the machine,
- a chamber containing a bed of roast and ground coffee to be extracted,
- an aluminum membrane disposed at the bottom end of the capsule, closing the said capsule, for retaining the internal pressure in the chamber, the said membrane being associated with piercing means for piercing dispensing holes in the said aluminum membrane when said internal pressure inside the chamber reaches a certain predetermined value,
- optionally, means configured to break the jet of fluid so as to reduce the speed of the jet of fluid injected into the capsule and distribute the fluid across the bed of substance at a reduced speed. It is critical for the user to know when the water level in the machine tank is too low to prepare a full beverage.

Capsules of the prior art as illustrated in FIG. 1, feature a top membrane which is to be pierced by the fluid injection needle of the beverage preparation machine.

When liquid is injected in the capsule compartment, a pressure is built up, which serves as an extraction means for extracting ingredients contained inside the capsule, as described above.

In prior art capsules, when the needle is removed from the capsule, after the beverage has been prepared and dispensed, the capsule top membrane is pierced and a hole remains as illustrated in FIG. 2. However, in such a case, the extraction fluid pressure "P" remains at least partly in the capsule compartment.

In case the capsule contains soluble ingredient to extract, the capsule compartment generally comprises one single portion, and the residual fluid pressure is distributed across the compartment volume.

In case the capsule compartment is divided into several portions, as illustrated in FIGS. 1 and 2, the residual pressure P is located in the top portion of the capsule compartment. In this case, the ingredient to be extracted, typically roast and ground coffee "RG", is contained in a central portion of the capsule, and a portion of the capsule compartment is disposed above said coffee ingredient, which is able to accommodate the fluid injection needle as illustrated in FIG. 1.

In all cases, due to the residual pressure P which remains inside the capsule compartment after the capsule has been used, a jet of liquid—often referred to as "whale effect"—can spray out of the capsule top membrane, through the hole pierced by the machine needle. Such a whale effect is represented in FIG. 2. Although such a phenomenon occurs randomly and infrequently, it is undesirable because hot liquid splashing out is messy. Moreover, in case said liquid is water mixed with an ingredient such a leakage of liquid from the capsule top membrane is also undesirable for a cleanliness point of view as it could create some bacteria growth around or inside the machine, which forces the consumer to spend time cleaning the machine and its surroundings after usage.

It is therefore one main objective of the present invention to provide a capsule which prevents the so-called "whale effect" described above.

SUMMARY OF THE INVENTION

The objective mentioned above is fulfilled with a capsule defining a closed chamber for enclosing a mass of soluble and/or extractable food material, for use in a beverage preparation machine, comprising:

(i) capsule side walls, (ii) a top membrane pierceable by injection means of the machine which are adapted to inject an extraction liquid under pressure inside said chamber, and (iii) a bottom wall (iv) means adapted to open said chamber by relative engagement with the bottom wall under the effect of the liquid pressure increase in the chamber during injection of said liquid characterized in that at least the portion of the top membrane surface which is to be pierced by the fluid injection means, comprises an elastic material having a tensile strength higher than 1 MPa, preferably higher than 5 MPa, more preferably higher than 10 MPa, and an elongation at break superior to 100%, preferably superior to 500%, such that said top membrane recloses in a leaktight manner, after said fluid injection means have been removed therefrom.

An elastic material suitable for the present invention should have a Young's modulus inferior to 150 GPa.

Due to the elasticity of the material, the top membrane can be pierced easily and deform when the liquid injection means of the machine are moved through. Then, after the liquid has been injected into the capsule, the injection means is removed therefrom and the top membrane closes back in a leaktight manner due to its high elasticity.

Preferably, the top membrane is able to withstand a fluid pressure of at least 1 bar, preferably at least 3 bar, more preferably at least 5 bar, after said fluid injection means have been removed therefrom.

In a preferred embodiment of the present invention, the bottom wall is a pierceable membrane, made of aluminium, paper, plastic, or a combination thereof.

Advantageously, the liquid injection means of the machine is a liquid injection hollow needle.

In a first alternative of the invention, the top membrane comprises one single layer of elastic material (i.e. it is a so-called monolayer membrane).

In a second alternative of the invention, the top membrane is a laminate comprising several superimposed layers which are at least partially assembled one to another, so that at least one of the constitutive layers of the laminate is made of an elastic material. Preferably, the lamination in the area where the needle pierces the top membrane is a weaker adhesion (or no adhesion) in comparison to other regions of the membrane, in order to facilitate the reclosing movement of the elastic layer.

In a third alternative of the invention, the top membrane comprises a non elastic film, at least of portion of which is coated with a layer of an elastic material.

In the third alternative, the elastic material is preferably coated onto said film in a liquid phase, which is then solidified by a heat, electron beam, or UV light curing/treatment.

In a fourth alternative of the invention, the top membrane comprises a non elastic film, at least of portion of which is covered with a layer of an elastic material with a glue using "sticker-like" application or using heat sealing or ultrasound sealing.

In a fifth alternative of the invention, the top membrane of the capsule is coated at least on a portion of its surface with a layer of silicone that is applied over its melting temperature (i.e. as a liquid form) such that it then solidifies as it cools down onto the membrane onto which it is applied ("hot melt application").

In all embodiments mentioned above, the elastic material is preferably a food-grade silicon, particularly a liquid mono-component silicon which is set by reaction with the atmospheric humidity (i.e. at ambient temperature). Examples of elastic materials include but are not limited to for instance: a food-grade thermoplastic elastomer such as SBC (Styrene Block copolymers), silicone or liquid silicone rubber, ethylene vinyl alcohol (EVA)-based elastomer, EPDM (Ethylene-propylene-diene-monomer) or an isoprene rubber.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
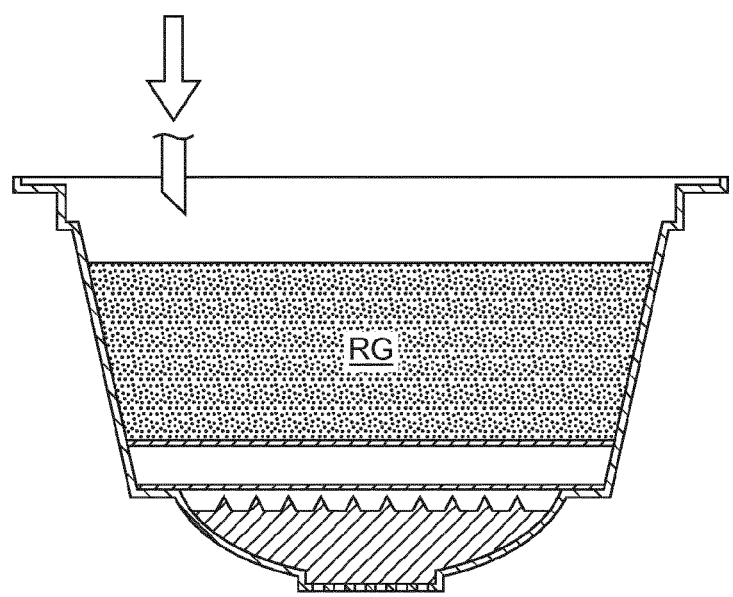
FIG. 1 is schematic profile cut view of a capsule according to the prior art at the beginning of liquid injection therein.
Figure 2:
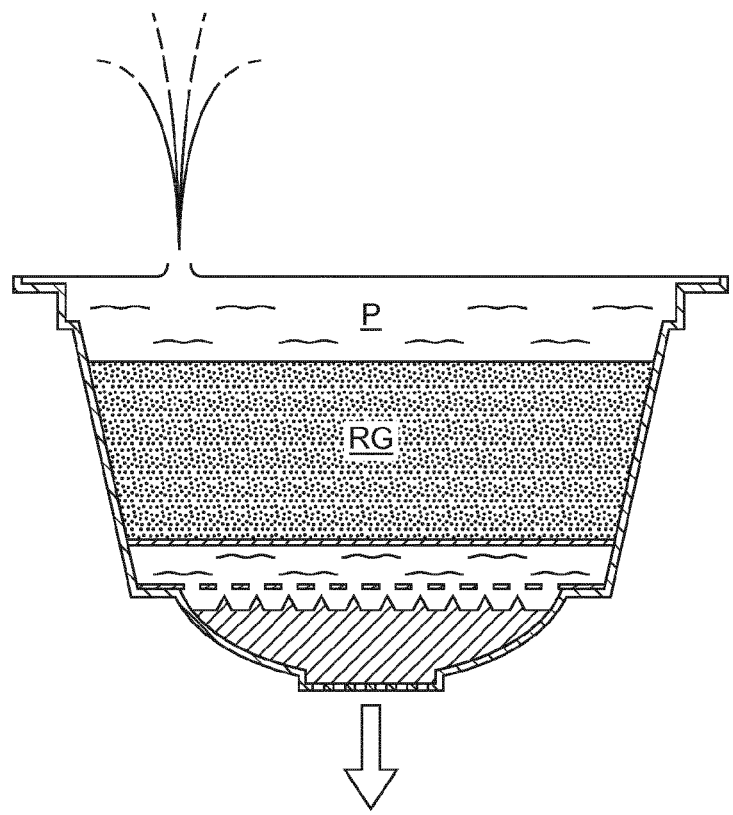
FIG. 2 is a view similar to FIG. 1, showing the backflow of liquid under pressure after the injection needle has been removed from the top membrane.

In the course of the present description, the term "top membrane" should be understood as the membrane which is pierced by the fluid injection needle of the machine, as opposed to the "bottom membrane" which should be understood as the membrane located on the opposite side of the capsule. This definition is such that "top" and "bottom" membranes are defined whatever the position of the capsule within the machine, when both capsule and machine are engaged in a functional manner.

The capsule 1 illustrated in FIGS. 3, 4, 5 and 6 comprises a capsule body defining a closed chamber for enclosing a mass of soluble and/or extractable food material "RG".

The capsule body comprises in particular:
(i) capsule side walls 2,
(ii) a top membrane 3 pierceable by an injection needle 4 of the machine which is adapted to inject an extraction liquid under pressure inside said chamber, and
(iii) a bottom wall 5 being an aluminium membrane.

Figure 6:
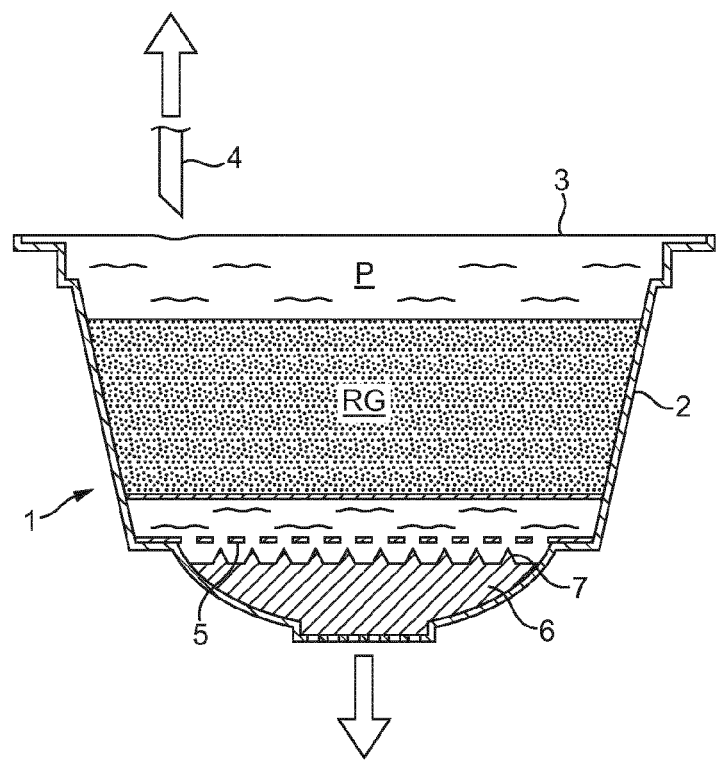
FIG. 6 is a schematic profile cut view of a capsule according to the invention, showing the reclosed membrane after the injection needle is removed.

As illustrated in FIG. 6, the capsule further comprises means adapted to open said chamber by relative engagement with the bottom wall under the effect of the liquid pressure increase in the chamber during injection of said liquid. These means comprise an rigid element 6 comprising spikes 7 on its surface turned towards the aluminium membrane 5. The rigid element 6 is generally referred to as "pyramid plate". Upon liquid injection inside the capsule compartment, pressure builds up, which deforms the aluminium membrane against the spikes 7 of the pyramid plate 6, until said membrane 5 is pierced, giving way to the beverage prepared inside the capsule towards the outside of the capsule, inside a cup (not illustrated).

According to the invention, at least the portion of the top membrane surface which is to be pierced by the fluid injection needle, comprises an elastic material having a tensile strength higher than 5 MPa, preferably higher than 10 MPa, and an elongation at break superior to 100%, preferably superior to 500%, such that said top membrane recloses in a leaktight manner, after said fluid injection means have been removed therefrom. More precisely, the top membrane is able to withstand a fluid pressure of at least 3 bar after said fluid injection means have been removed therefrom.

Figure 3:
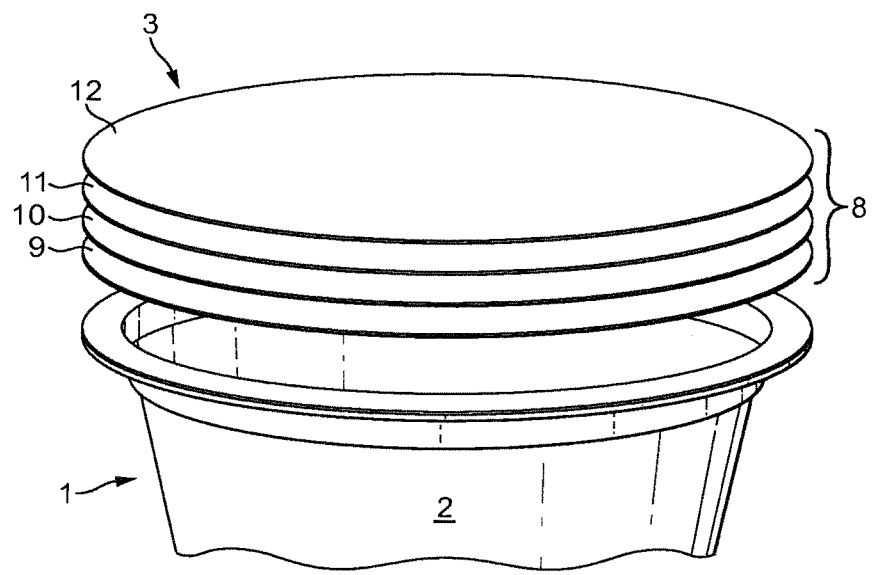
FIG. 3 is a partial perspective exploded view illustrating the detail of a laminated top membrane according to the invention.

In a first embodiment illustrated in FIG. 3, the top membrane 3 is a laminate comprising several superimposed layers 8 which are at least partially assembled one to another, so that at least one of the constitutive layers of the laminate is made of an elastic material. For instance, in the embodiment illustrated in FIG. 3, the top membrane 3 comprises four superimposed layers. The lowermost layer 9 comprises an elastic silicone layer having a tensile strength of about 10 MPa, and an elongation at break of about 700%. The first intermediate layer 10 disposed immediately above is made of a polypropylene material (Young's modulus of about 1.5 GPa and yield strength of about 40 MPa). The second intermediate layer 11 disposed immediately above is made of an elastic silicone layer having a tensile strength of about 10 MPa, and an elongation at break of about 700%. And the uppermost layer 12 is made of a polyethylene (Young's modulus of about 0.6 GPa and yield strength of about 35 MPa).

Figure 4:
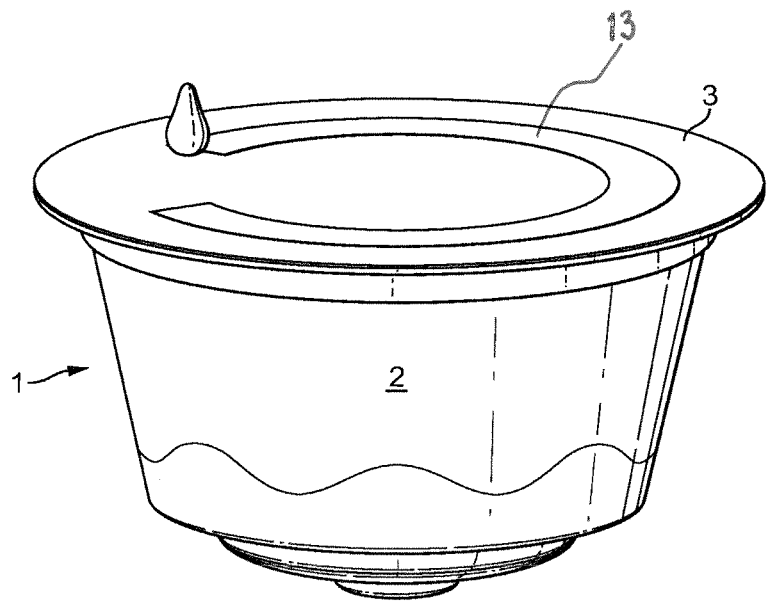
FIG. 4 is a schematic perspective view of a capsule according to the invention, wherein an elastic top ring is being deposited at the surface of the top membrane.

In a second embodiment illustrated in FIG. 4, the top membrane 3 is coated with a ring 13 of silicone deposited as a liquid onto the capsule top membrane surface. More precisely, a portion of the top membrane upper surface is coated with a layer of a silicone elastic material having a tensile strength of about 10 MPa, and an elongation at break of about 700%. The layer of silicone is deposited as a liquid and then set at room temperature by using UV light treatment. The silicone that is used is food grade. The ring 13 has a thickness of between 0.1 and 1 mm, preferably a thickness between 0.3 mm and 0.7 mm. It has width larger than the diameter of the liquid injection needle 4, preferably three times as large as the needle. The ring is positioned onto the top membrane 3 in such a way that whatever the rotational position of the capsule in the machine, the needle pierces through the zone of said top membrane which is coated with the silicone ring. It could also be envisaged that the lower surface of the top membrane be coated with an elastic material, however such an embodiment is not preferred as it is considered easier to coat the upper side of said top membrane.

Figure 5:
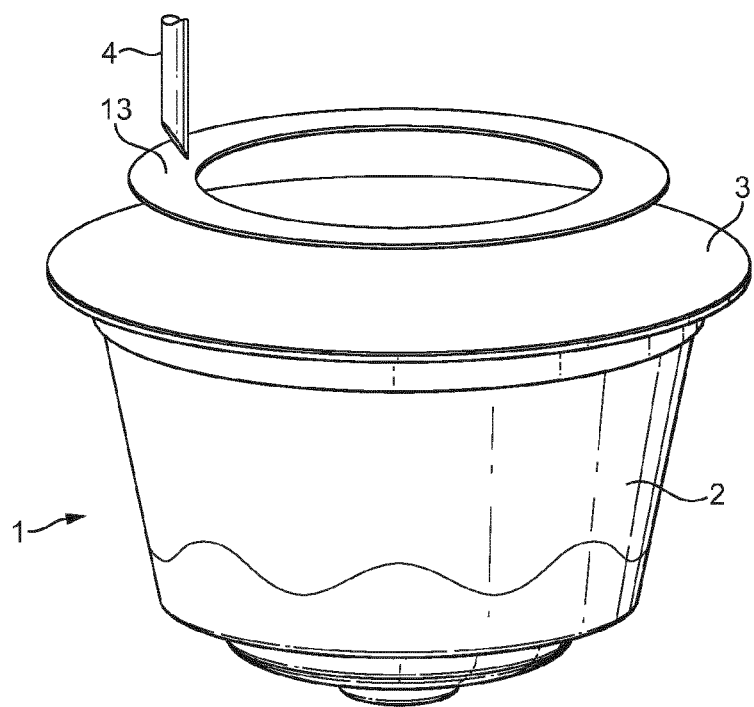
FIG. 5 is a schematic view similar to FIG. 4, showing an alternative embodiment of the invention.

In a third embodiment illustrated in FIG. 5, the top membrane 3 is bonded with a ring of silicone 13. The material used for the ring is a silicone elastic material having a tensile strength of about 10 MPa, and an elongation at break of about 700%. The ring 13 has a thickness of between 0.1 and 1 mm, preferably a thickness between 0.3 mm and 0.7 mm. It has width larger than the diameter of the liquid injection needle 4, preferably twice as large as the needle. The ring is positioned onto the top membrane 3 in such a way that whatever the rotational position of the capsule in the machine, the needle pierces through the zone of said top membrane which is coated with the silicone ring, as illustrated in FIG. 5. The ring 13 is bonded to the top membrane 4 using a food-grade adhesive.

Instead of a ring shape, which is preferable as the consumer does not need to orient the capsule, it is possible to have only a simple disc which is deposited as a disc of liquid silicone which is then set as described above, or alternatively, as a premade disc of silicone which is attached to the surface of the membrane by glue, or heat sealing or ultrasound sealing, preferably not sealing the area exactly under the needle penetration but sealing around. Such a disc of silicone (not illustrated in the drawing) has a diameter of at least twice the diameter of the needle. In that case, the capsule shape is preferably modified in a non circular shape, in order to provide an orientation of the capsule inside the capsule holder or inside the machine, in such a way that, in operation, the needle pierces through the disc. Alternatively, the capsule design or a drawing on the capsule indicates the consumer what is the correct orientation of the capsule inside the capsule holder or inside the machine.

In all embodiments described above, laboratory tests showed that layers of an elastomer such as silicone—alone or in combination as a layer in a multilayer membrane, or as coating or ring—, wherein the elastomer layer as a thickness of between 0.05 and 1 mm, preferably a thickness between 0.1 mm and 0.5 mm delivers good results in terms of reclosability and leak tightness, when the internal residual pressure inside the capsule after product preparation is between 0.5 and 5 bar (relative pressure to atmospheric pressure).

In such tests, the diameter of the needle was comprised between 0.5 mm and 3 mm, and more precisely between 1.0 mm and 1.6 mm. For instance the needle can have 1.5 mm in diameter with a 30° apex cut angle. The needle used for the liquid injection in the capsule is stainless steel.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A capsule defining a chamber for enclosing a mass of soluble and/or extractable food material, for use in a beverage preparation machine, the capsule comprising:
    capsule side walls;
    a top membrane comprising a laminate that comprises superimposed layers, the superimposed layers comprising a polypropylene layer, a polyethylene layer, and at least one elastic silicone layer, the laminate is pierceable by a fluid injection member of the beverage preparation machine which is adapted to inject an extraction liquid under pressure inside the chamber;

a bottom wall; and an opening member adapted to open the chamber by relative engagement with the bottom wall under the effect of the liquid pressure increase in the chamber during injection of the extraction liquid, the at least one elastic silicone layer having a tensile strength greater than 1 MPa and an elongation at break greater than 100%, such that the top membrane recloses in a leaktight manner after the fluid injection member has been removed therefrom, and lamination in an area of the laminate where the fluid injection member pierces the top membrane has a weaker adhesion relative to other areas of the laminate.

2. The capsule of claim 1, wherein each of the superimposed layers extends to the capsule side walls.

3. The capsule of claim 1, wherein the bottom wall is a pierceable membrane made of a material selected from the group consisting of aluminium, paper, plastic, and a combination thereof.

4. The capsule of claim 1, wherein the at least one elastic silicone layer has a tensile strength of about 10 MPa and an elongation at break of about 700%.

5. The capsule of claim 1, wherein the superimposed layers comprise a lowermost layer comprising at least one of the at least one elastic silicone layer.

6. The capsule of claim 1, wherein the superimposed layers comprise an uppermost layer comprising the polyethylene layer.

7. The capsule of claim 1, wherein the superimposed layers comprise a lowermost layer, an uppermost layer, and at least one intermediate layer between the lowermost layer and the uppermost layer.

8. The capsule of claim 7, wherein the at least one intermediate layer comprises at least one of the at least one elastic silicone layer.

9. The capsule of claim 7, wherein the at least one intermediate layer comprises the polypropylene layer.

* * * * *